(12) United States Patent
Tanabe

(10) Patent No.: US 6,289,598 B1
(45) Date of Patent: Sep. 18, 2001

(54) LENGTH MEASURING DEVICE

(75) Inventor: Kenji Tanabe, Gunma-ken (JP)

(73) Assignee: Tanabe Seisa sho Limited, Gunma-ken (JP)

( * ) Notice: Subject to any disclaimer, the term of this patent is extended or adjusted under 35 U.S.C. 154(b) by 0 days.

(21) Appl. No.: 09/372,072

(22) Filed: Aug. 11, 1999

(30) Foreign Application Priority Data

Aug. 12, 1998 (JP) .................................................. 10-241059

(51) Int. Cl.[7] ...................................................... G01B 5/02
(52) U.S. Cl. ................................ 33/465; 33/452; 33/495
(58) Field of Search ........................... 33/415, 418, 452, 33/453, 465, 471, 483, 484, 485, 486, 495–500, 712, 783, 806, 520, 807, 808, 594, 832, 534, 538

(56) References Cited

U.S. PATENT DOCUMENTS

| | | | |
|---|---|---|---|
| 226,429 | * | 4/1880 | Varnum ................................... 33/810 |
| 3,561,122 | * | 2/1971 | Beckwell ................................ 33/471 |
| 3,623,231 | * | 11/1971 | Holt ......................................... 33/538 |
| 4,472,883 | * | 9/1984 | Ortega .................................... 33/518 |
| 4,660,293 | * | 4/1987 | Kovacs .................................... 33/471 |
| 5,375,340 | * | 12/1994 | Gerritsen ................................ 33/534 |
| 5,426,859 | * | 6/1995 | Concari et al. ...................... 33/27.02 |
| 5,687,628 | * | 11/1997 | Liao ....................................... 33/500 |

* cited by examiner

Primary Examiner—Andrew H. Hirshfeld
(74) Attorney, Agent, or Firm—Townsend & Banta

(57) ABSTRACT

A length measuring device is used for measuring a length of from a virtual intersection of the extension lines of two surfaces extending along the respective sides A1, A2 to ends of the respective sides of a bent member. The length measuring device is comprised of a rotary body 20 rotating about the virtual intersection as a center O and a scale body 30 having graduations (divisions). The rotary body 20 has a contacting side 20c with which one side of the bent member A is brought into contact, while the scale body 30 has a contacting side 30c with which the other side of the bent member A is brought into contact. The two contacting sides 20c, 30c are arranged on straight lines drawn through the virtual intersection.

13 Claims, 8 Drawing Sheets

FIG.4(a)
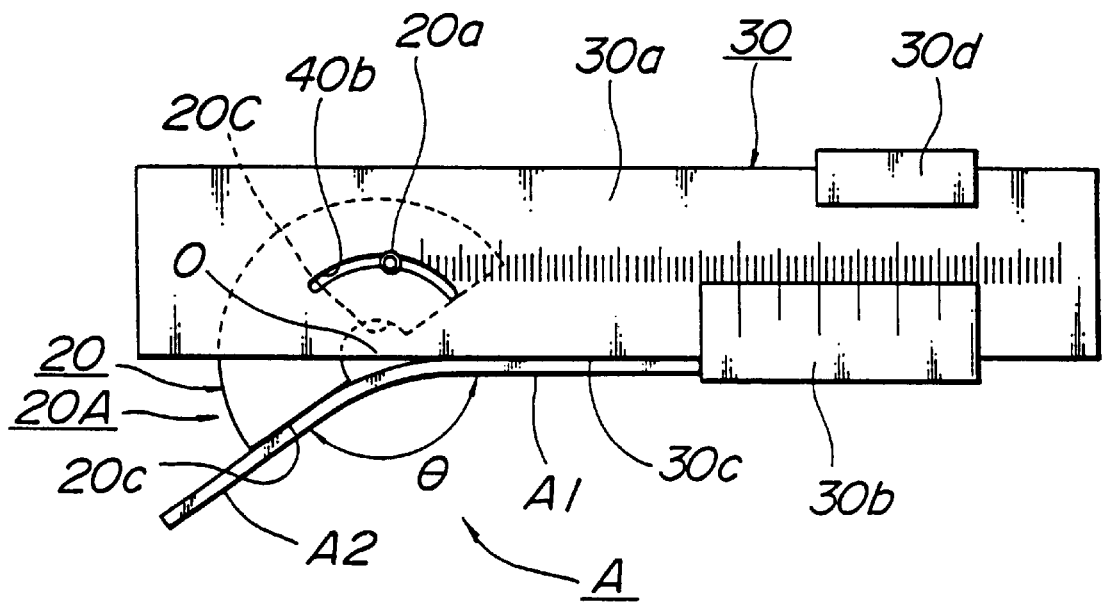
FIG.4(b)
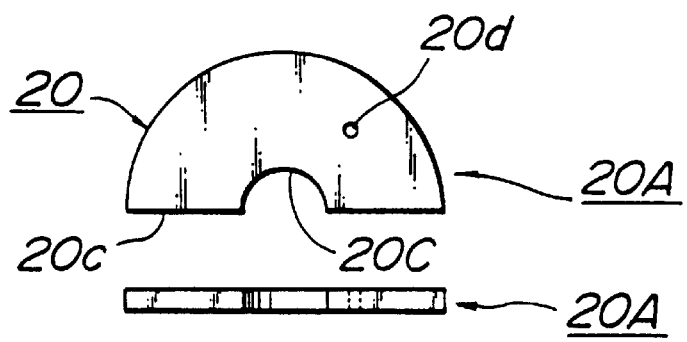
FIG.4(c)

FIG.5(a)
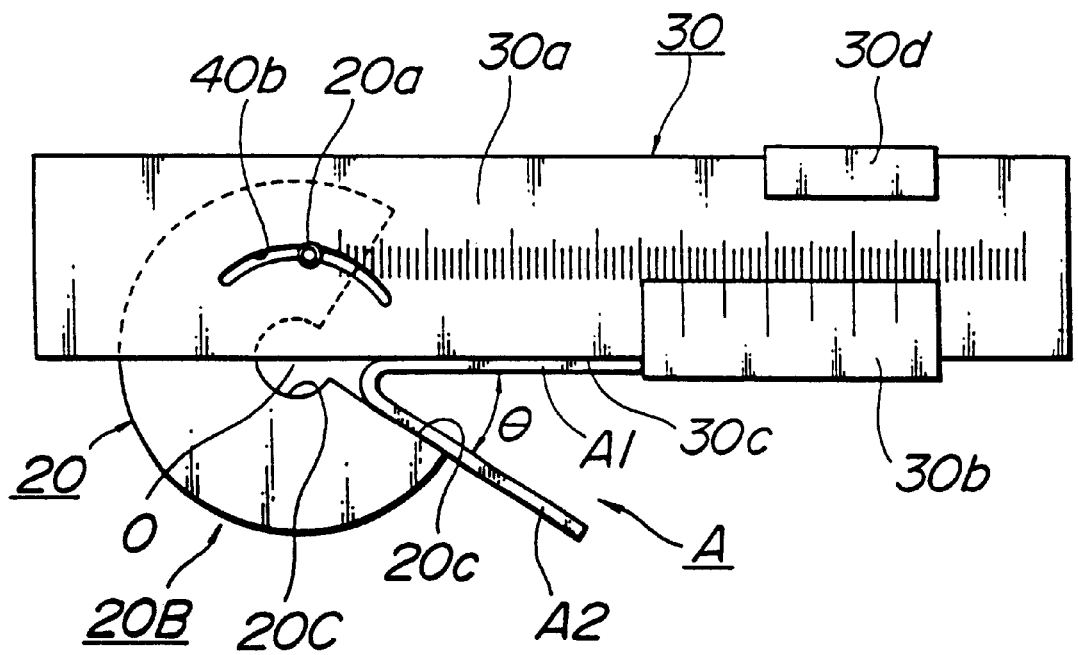
FIG.5(b)
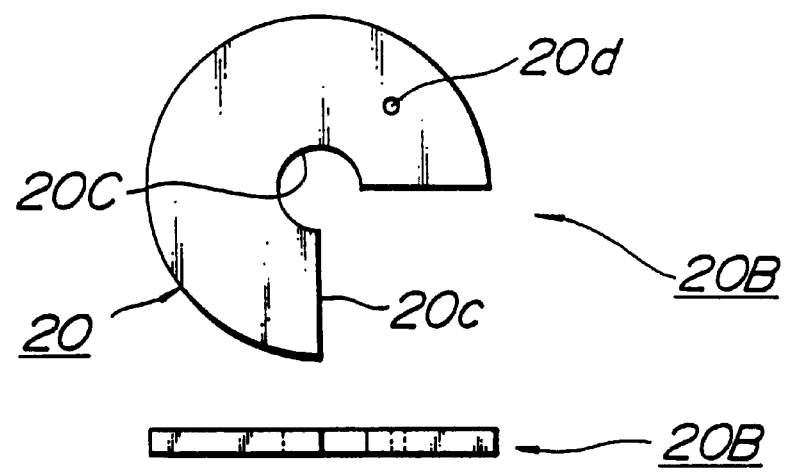
FIG.5(c)

FIG.6(a)
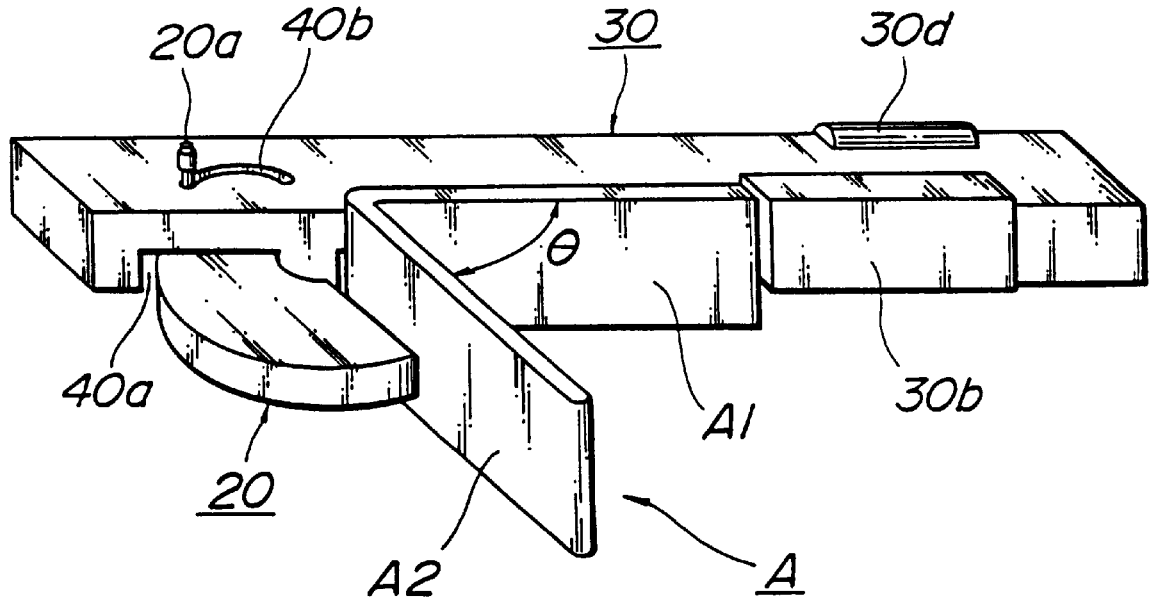
FIG.6(b)
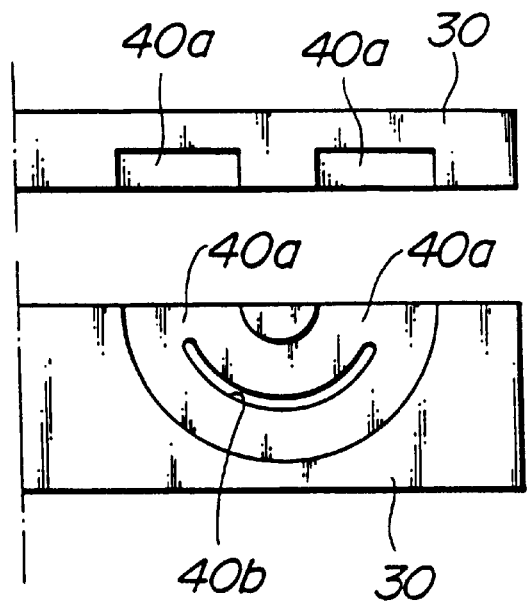
FIG.6(c)

FIG.7(a)
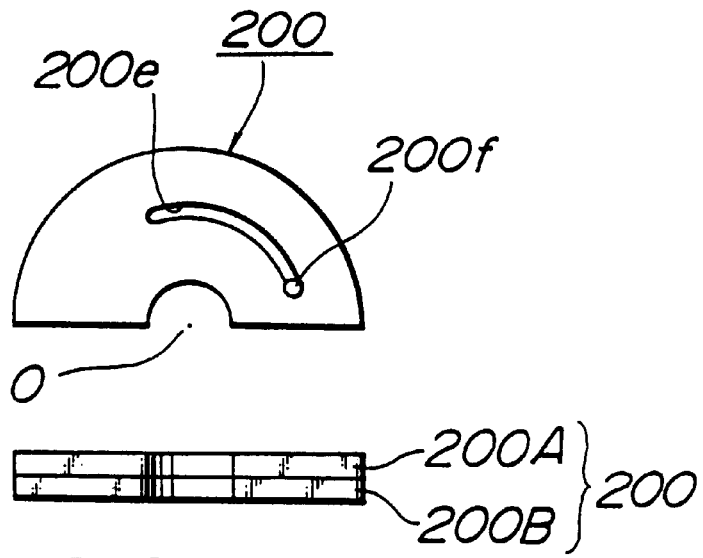
FIG.7(c)
FIG.7(b)
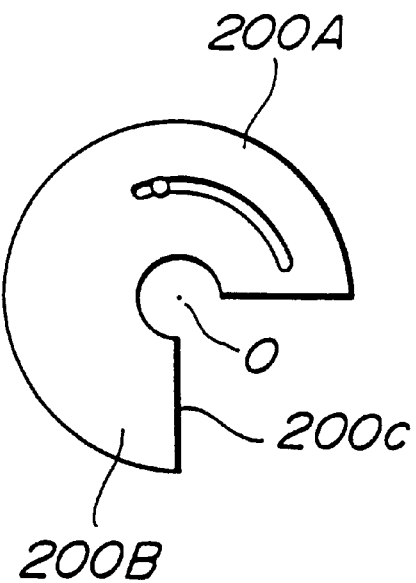

LENGTH MEASURING DEVICE

BACKGROUND OF THE INVENTION

1. Field of the Invention

This invention relates to a length measuring device, in particular to a length measuring device which makes it possible to directly read a length of two sides of a bent member from a virtual intersection of the extension lines of two sides of a bent member folded with an arbitrary angle, wherein "the virtual intersection of two faces" means an intersection at which the extensions of two outer surfaces extending along the respective sides intersect each other in a meeting area (a bent area).

2. Description of the Prior Art

In plate processing, there are many cases where the processing of bent member A formed of two or more sides is made. However, since the bent member A is made by bending a plate, a bent area in which two sides A1, A2 of bent member A as shown in FIGS. 1(a), 1(b) meets is not formed into an acute angle, but formed into a curved form.

On the other hand, in the instruction in the drawing in plate processing, dimensions L1, L2, L3 from an intersection P of extension lines of two faces of a bent member is shown. However, since the actual bent area of the bent member is curved, it is impossible to directly read the length from the virtual intersection P the virtual an actual article.

In the inspection of bent member, it is needed to measure dimensions L1, L2, L3. In a conventional job site, a board is put on one side for which measurement is made, while the other side is located on a holder, and a measurement of a length between the board and the upper surface of the holder is made using a vernier caliper. However, using this method, only an approximate value is obtained. Further, recently, three-dimensional measuring device and others appear, by which dimensions of from an intersection can be measured. However, the three-dimensional measuring device is extremely high in cost so that it cannot be easily applied.

Further, when bending a plate so as to form a desired bent member, it is useful to know the respective dimensions (developed dimensions) of both straight faces and the bent area of the bent member formed from the plate. For example, developed dimensions corresponding to a bent member shown in FIG. 1(a) are as shown in FIG. 2. Therefore, if a ratio of dimension L to dimension L1, L2, which is dependent on a bending angle and a thickness of plate, is known, it is possible to know developed dimensions of plate by knowing dimensions L1, L2. To preset developed dimensions is specially useful for locating holes bored in a plate at a given position in a bent member.

BRIEF SUMMARY OF INVENTION

Accordingly, it is an object of the invention to provide a length measuring device which has a simple construction, handy to use, and besides enables to directly read dimensions of from an intersection of two faces of a bent member bent at a arbitrary angle.

The present invention is characterized in that in a length measuring device for measuring a length from a virtual intersection of the extension lines of two outer surfaces extending along the respective sides, to ends of the respective sides of a bent member, the length measuring device comprises a rotary body rotating about the virtual intersection and a scale body having graduations (divisions). The rotary body has a contacting side with which one side of the bent member is brought into contact, while the scale body has a contacting side with which the other side of the bent member is brought into contact, and that the two contacting sides are arranged on straight lines drawn through the virtual intersection.

In the present invention, a shape of a rotary body is not specially restricted. A rotary body is preferably a partially cut disk formed nearly into a fan-shape observing from the top, which is made by cutting a sector with a given angle about a center of a circular plate from the circular plate, the partially cut disk is rotatable about the center of the circular plate as a center of rotation, and at least one end extending in a radial direction of the partially cut disk forms a contacting side of the rotary body. In the description of the present application, "fan-shape" include a fan-shape having an angle more than 180°.

Further, in the present invention, a rotary body itself or a contacting side of the rotary body can be formed so as to be able to slide so that a length of from a center of a rotary body to ends of the body of rotation can be altered.

In particular, when making a measurement for one side of a bent member having a complicated sectional form, for example having sides more than two, there is a case where it is advantageous to shorten dimension of contacting side so that another side does not interfere with a length measuring device.

In the present invention, a means for rotating the rotary body is preferably mounted at a position other than the center of rotation of the rotary body. The means for rotating the rotary body can be preferably selected from the group consisting of a bearing inserted between the rotary body and the main body thereof, a fan-shaped guide groove which is mounted on a body of the length measuring device and which has a form formed along the locus of rotation of the fan-shaped rotary body, a concave guide and a covex guide which are provided on any of an opposed surfaces of the rotary body and the main body thereof, respectively, so as to be slidably engaged with each other, wherein the above-mentioned description does not mean to exclude an embodiment in which a shaft of rotation is provided at a center of rotation. Since it is feared that a thick shaft of rotation interferes with the measurement, for example, the diameter of shaft of rotation is minimized or a shaft of rotation is provided so as to able to be detachable so that the shaft of rotation can be pulled out when taking measurements.

BRIEF DESCRIPTION OF THE DRAWINGS

In the drawings:

FIGS. 1(a) and (b) are a side elevation of a bent member in the prior art, wherein FIG. 1(a) shows a case where a bending angle is smaller than 90°.

FIGS. 3(a)(b) show a length measurement device according to a first embodiment of the present invention, wherein FIG. 3(a) is a top view of the length measurement device.

FIGS. 4(a)(b) and (c) show a length measurement device according to a second embodiment of the present invention, wherein FIG. 4(a) is a top view of the length measurement device, FIG. 4(b) is a top view, and FIG. 4(c) is a side elevation of a rotary body;

FIGS. 5(a)(b) and (c) show a length measurement device according to a second embodiment of the present invention, wherein FIG. 5(a) is a top view of the length measurement device, FIG. 5(b) is a top view, and FIG. 5(c) is a side elevation of a rotary body;

FIGS. 6(a)(b) and (c) show a length measurement device according to a second embodiment of the present invention, wherein FIG. 6(a) is a schematic perspective view of the length measurement device, FIG. 6(b) is a side elevation, and FIG. 6(c) is a bottom view of a side of an end of a scale body;

FIGS. 7(a)(b) and (c) show a length measurement device according to a third embodiment of the present invention, wherein, FIG. 7(a) is a top view, FIG. 7(c) is a side elevation of a rotary body of the length measurement device, and FIG. 7(b) is a top view showing a state where one rotary body is slided.

DETAILED DESCRIPTION

Figure 1A:
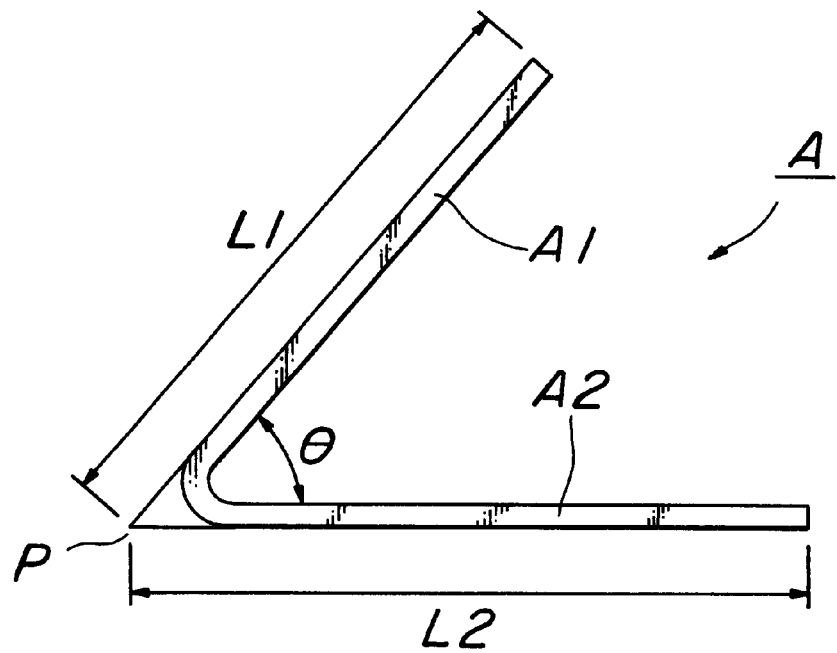
Figure 1B:
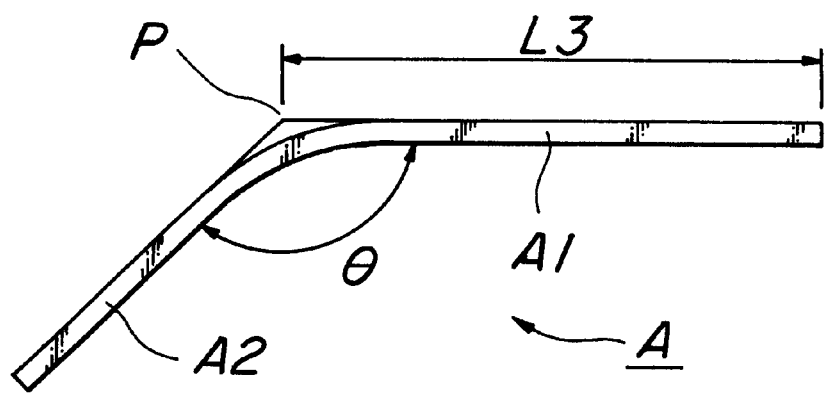
FIG. 1(b) shows a case where a bending angle is more than 90°.
Figure 2:
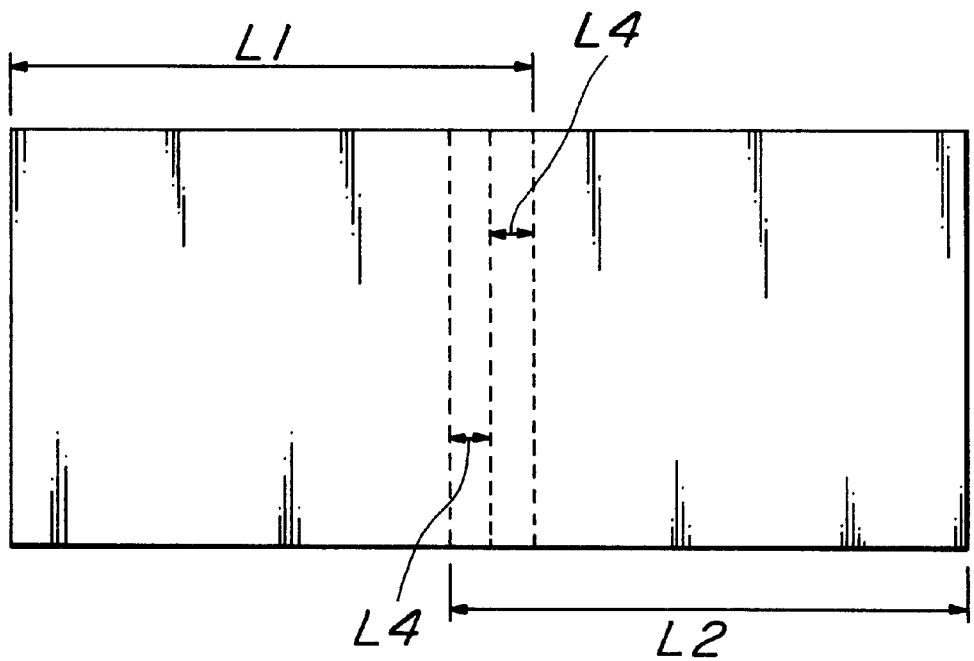
FIG. 2 is a top view of the bent member in the prior art developed into a flat plate.
Figure 3A:
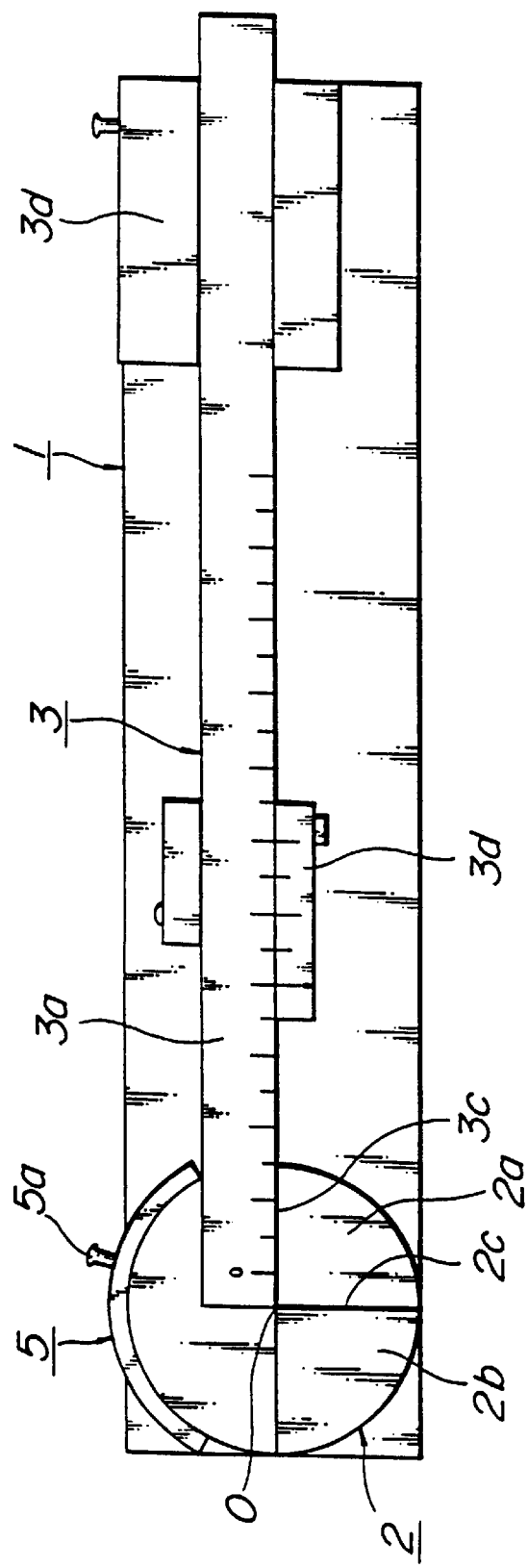

Referring to the drawings, an embodiment of the present invention is explained, FIG. 3(a) is a top view of the length measurement device according to a first embodiment of the present invention. The length measurement device is comprised of a planar base 1 having a rectangular form observing from the top, a rotary body 2 rotatably mounted on the upper surface of the base 1 at an end in the longitudinal direction of the base 1, and a scale body 3 mounted on the upper surface of the base 1 extending in the longitudinal direction of the base 1.

The rotary body 2 is comprised of a circular main body 2a, a fan-shaped raised body 2b formed integrally with the main body, and a contacting side 2c formed by an end of the raised body 2b. The rotary body is formed into a normal circle, The rotary body is mounted on the base 1 so as to turn about a center of the circle as a center of rotation O. In taking measurements, a center of rotation O of the rotary body 2 is located on a virtual intersection P of the extensions of outer surfaces of two sides of a bent member A which is an object of measurements.

Figure 3B:
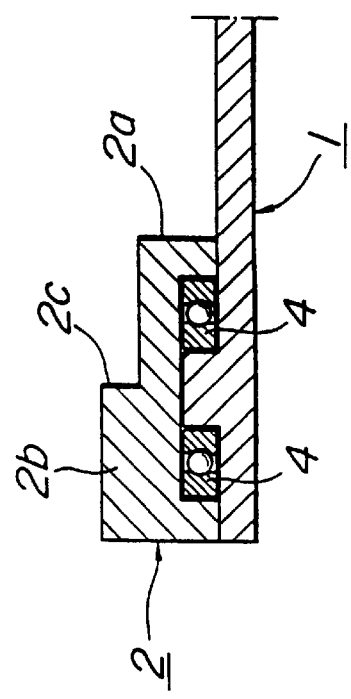
FIG. 3(b) is a partially cut side elevation showing the mounting of a rotary body to a scale body.

In the embodiment, as shown in FIG. 3(b), bearings 4 are provided on the base 1, and the lower side of the main body 2a is engaged with the bearings 4 so that the rotary body 2 is rotatable. However, means for rotatably mounting the rotary body 2 on the base 1 is not restricted to this structure. Other means which can be selected by person having ordinary knowledge in the technical field can be applied.

As to a shape of the rotary body 2 and a shape of the fan-shaped raised body, they are not restricted to them in the above-mentioned embodiment. In short, it is sufficient that the rotary body 2 is rotated about a virtual intersection as a center of rotation O and has a contacting side 2c. As to the contacting side 2c, a starting point of extending of the contacting side 2c is not necessarily a center of rotation O. It is sufficient that the contacting side 2c is located on a straight line drawn through a virtual intersection P. Accordingly, for example, the rotary body 2 is not necessarily formed into a circle. It is not necessary that the raised body 2b has a fan-shape with a central angle 90° (¼ circle), raised body 2b can be formed as a longitudinal member in such a manner that the peripheral portion thereof is used as a contacting side. In fact, with the regard to easiness of design, efficiency of assembly and others it is desirable that the rotary body 2 is formed generally into a circle and raised body 2b has a shape of ¼ circle observing from the top.

For the scale body 3, the construction of conventional vernier caliper is applied, wherein the scale body 3 is comprised of a main scale 3a in which the side of one end thereof is located close to a center of rotation O of the rotary body 2, while the side of the other end thereof is extended in the longitudinal direction of the base 1, and a sub scale 3b slidably mounted against the main scale 3a. The side of the other end of the scale body 3 is fixed on the base 1 through attaching member 3d. The side of one end of the scale body 3 forms a contacting side 3c, wherein the contacting side 3c is located on a straight line drawn through a center of rotation O. Further, the direction of the graduations of the scale body 3 is parallel to the longitudinal direction of the contacting side 3c. In the embodiment, the contacting side 3c has a starting point on a center of rotation. However, the starting point of the contacting side 3c can be located at a point distant from a center of rotation O. Further, the scale body is not necessarily a vernier caliper. If a length of from a center of rotation can be measured, the other means can be applied.

A circular fixing member 5 is mounted at the peripheral portion of the rotary body 2 so that the rotary body 2 can be temporarily fixed at a desired position by turning a screw 5a in the advancing direction. In fact, a means for temporarily fixing the rotary body 2 is not restricted to this. Further, the fixing member is convenient if it is provided for the rotary body 2, but it is not necessarily needed.

FIGS. 4(a)(b) and (c) and FIGS. 5(a)(b) and (c) show the second embodiment of the present invention, wherein in both drawings, (a) is a top view of the length measurement device, (b) is a top view, and (c) is a side elevation of a rotary body. The length measurement device is comprised of a planar scale body 30 having a rectangular form as observed from the top, and a rotary body 20 rotatably mounted on the side of one end of the scale body 30. For the scale body 30 in the same manner as the first embodiment, the construction of conventional vernier caliper is applied, wherein the scale body 30 is comprised of a main scale 30a forming a main body of the scale body 30 and a sub scale 30b slidably mounted against the main scale 30a. One side of main scale 30 forms a contacting side 30c, and the contacting side 30c is located on a straight line drawn through a center of rotation O. Further, the extending direction of the contacting side 30c and the direction of the graduations of the scale body agree. The construction of the scale body 30 should not be restricted to the above-mentioned vernier caliper. In short, if a length of from the center of rotation O can be measured, another means can be applied.

In the second embodiment, the rotary body 20 is comprised of bodies of rotation 20A and 20B of two kinds which are detachable so that the bodies of rotation 20A and 20B can be selectively applied according to arbitrary bending angle θ of bent member. The rotary body 20A is formed into a nearly half circle and is a partially cut disk having a cut portion 20c in a portion of a center of rotation. The rotary body 20A is advantageously used when an angle θ at which the extensions of two sides of a bent member A which is an object to be measured meet with each other is more than 90°.

The rotary body 20B is formed into a nearly ¾ circle and is a partially cut disk having a cut portion 20c in a portion of a center of rotation. The rotary body 20B is advantageously used when an angle θ at which the extensions of two sides of a bent member A which is an object to be measured meet with each other is below 90°. The peripheral portion of the rotary body raising in the radial direction forms a contacting side 20c, wherein the contacting side 20c is located on a straight line drawn through the center of rotation O. The rotary body 20A, 20B are suitably selected according the bending angle θ of a bent member A. The shapes(angles) of the bodies of rotation 20A, 20B are not restricted to them shown in the drawings. For example, the body if rotation 20A can be formed into a fan-shape with angle of 170° and the rotary body 20B can be formed into a fan-shape with angle of 250°.

FIG. 6(a) is a schematic perspective view of the length measurement device according to the second embodiment, and FIG. 6(b) is a side elevation, and FIG. 6(c) is a bottom view of a side of an end of a scale body, wherein the lower side of the slide of one end of the scale body 30 is formed with a rotary guide groove 40a of the rotary body 20 by cutting a portion of the scale body 30. The rotary guide groove 40a is a circular arc-shaped or half doughnut-shaped concave portion. The partially-cut-circle-shaped rotary body 20 is engaged with the scale body 30 so that the rotary body can be rotated about the intersection of two faces of a bent member A as a center of rotation by turning the rotary body 20 while sliding. The scale body 30 is formed with a circular arc-shaped slit 40b at a portion corresponding to the guide groove 40a so that the rotary body 20 is prevented from slipping out from the scale body 30 by regulating movement of a pin 20a attached to a pin hole 20d and projecting from the rotary body 20 along the slit 40b. It is preferable that the height of the rotary body 40a is nearly equal to the thickness of the rotary body 20 and the lower face is flush with the lower face of the rotary guide groove 40a.

Means for rotating the rotary body 20 is not restricted to the above-mentioned means. For example, any one of opposed faces of the scale body 30 and the rotary body 20 is formed with a circular arc-shaped convex portion, while the other face can be formed with a circular arc-shaped concave portion so that the circular arc-shaped convex portion and the circular arc-shaped concave portion can be engaged with each other so as to be able to slide in the direction of rotation. Or, another means which can be also suitably selected by person having ordinary knowledge in the technical field. Further, it is possible to measure dimensions of a bent member made by bending both ends of a plate at arbitrary angle, by providing another rotary body at an end of the slidable sub scale 30b on the side of the rotary body 20.

FIGS. 7(a)(b) and (c) show a length measurement device according to a third embodiment of the present invention, which is an alternation of the second embodiment, and had a character in the construction of a rotary body 200. The rotary body 200 is comprised of a half-circular bodies of rotation 200A, 200C which lie on top of another and are engaged with each other in such a manner that both bodies of rotation are able to rotate to each other about a center of rotation O so that the rotary body 200 can be accommodated to an arbitrary bending angle θ by shifting one rotary body 200B against the other rotary body 200A while sliding in the rotary direction. In FIG. 7(b), a peripheral portion raising in the radial direction forms a contacting side 200c. In the embodiment shown in the drawings, the rotary body 200 is formed of two bodies of rotation 200A, 200B. However, it is not needed that angles of the bodies of rotation 200A, 200B are nearly 180°, and that shapes of both are the same to each other. Further, it is possible that the rotary body is formed of three or more bodies of rotation. Means for slidably connecting bodies of rotation 200A, 200B is not specially restricted. For example, the bodies of rotation 200A, 200B can be formed with a circular arc-shaped guide slit 200e so that a guide body 200f projected from one rotary body can be moved in a guide slit 200e.

Figure 8:
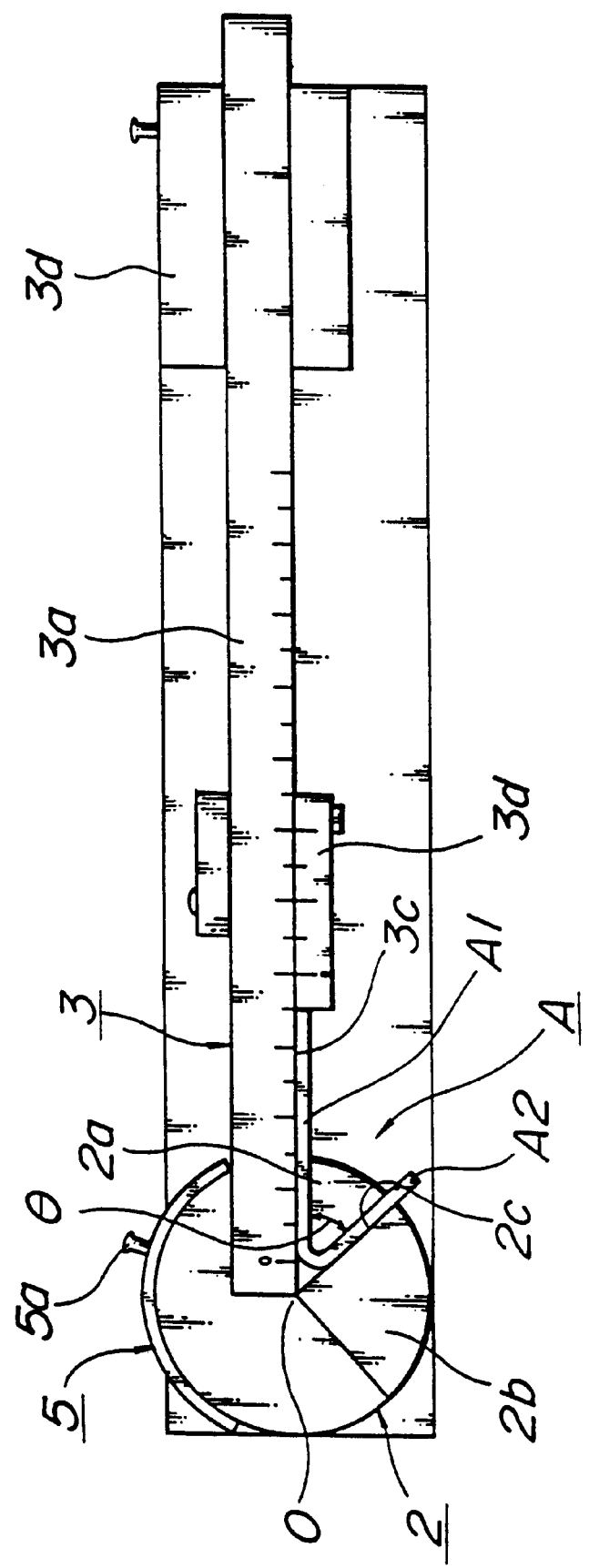
FIG. 8 is a view showing a method of measurement by a length measurement device according to a first embodiment of the present invention.

Then, a method of measurement by a length measuring device of the present invention is explained. FIG. 8 shows the measurement by the length measuring device according to the first embodiment of the present invention. First, an end of a bent member is brought into contact with the upper face of the main body 2a by locating a meeting portion of the extension lines of two sides (bent portion) close to the center of rotation O so that one side A1 of the bent member A which is an object to be measured is brought into contact with the contacting side 3c. Then, the contacting side 2c of the raised portion 2b is brought into contact with the other side A2 of the bent member A so that the position of the bent body is kept by inserting the bent body A between the two contacting sides 2c, 3c. Then, it is possible to measure a length of from the intersection by reading graduation of the scale body 3. The explanation about how to read graduation of vernier caliper forming the scale body 3 is omitted, since it is obvious for person having ordinary knowledge in the technical field. When measuring a length of the other side A2, the other side A2 is brought into contact with the contacting side 3c of the scale body 3, and the same operation is carried out.

A method of measurement by a length measuring device according to the second embodiment is explained referring to FIGS. 4(a)(b) and (c), and FIGS. 5(a)(b) and (c). First, one side A1 which is an object to be measured is brought into contact with the contacting side 30c of the scale body 30. Then, the contacting side 20c is brought into contact with the other side A2. Then, it is possible to measure a length of from the intersection by reading graduation of the scale body 30. When measuring a length of the other side A2, the other side A2 is brought into contact with the contacting side 30c of the scale body 30, and the same operation is carried out. In the measurement by the length measuring device according to the second embodiment, even if ends of a bent member A are not positioned on the same plane, good measurement can be carried out. In this point, the second embodiment is more advantageous than the first embodiment. In the first embodiment, since a measurement is made under the state where ends of a bent member are brought into contact with the upper face, in case where ends of a bent member is cut into a complicated shape, the measurement is difficult.

A method of measurement by a length measuring device according to the third embodiment is the same with a method of measurement by a length measuring device according to the second embodiment. For convenience' sake, an example of a bent member having only two sides is shown. However, a bent member can be bent in such a manner that the bent member has a three or four observing from the side. Further, although the length measuring device is used for measuring dimensions of a bent member A having a curved portion, the length measuring device can be applied for measuring a length of a member having an acute angle portion or pointed part, Further, although the present invention is directed for a bent member, even in case where bent member A is a pipe material, the measurement of a length of the bent member A formed of a pipe material is made possible by putting the circumference of the pipe material on a contacting side.

As above-mentioned, according to the present invention, a length of from an intersection of the extensions of two surfaces of a bent member with arbitrary angle can be easily directly read.

What is claimed is:

1. A length measuring device for measuring a length from a virtual intersection of extension lines of two sides of a bent member to an end of either of two sides of the bent member, said length measuring device comprising:

a scale body having graduations, an upper surface, a first end, a second end, and an arc-shaped slit;

a rotary body having a pin hole, said rotary body rotatably mounted in an arc-shaped groove in the scale body; and a pin slidably engaged in the arc-shaped slit capable of engaging said pin hole of said rotary body, wherein the rotary body has a first contacting side, the scale body has a second contacting side, and the first contacting side and the second contacting side are arranged to be on straight lines which cross at an intersection to be aligned with the virtual intersection when the sides of the bent member engage the first and second contacting sides, said graduations having a zero point at said intersection of said straight lines.

2. The length measuring device according to claim 1, wherein the rotary body has a semi-circular shape with a circumference of at least 180°, an axis of rotation, a first contacting end and a second end, said first contacting end being said first contacting side, and said rotary body being rotatable about a center of rotation.

3. The length measuring device according to claim 2, wherein a hole is formed in the rotary body at the axis of rotation thereof.

4. The length measuring device according to claim 2, wherein said rotary body is removably mounted in said arc-shaped groove, thereby enabling a user to remove said rotary body and replace same with another rotary body having different dimensions.

5. The length measuring device according to claim 2, wherein the rotary body is comprised of a plurality of partially cut disks mounted on the scale body, each of said partially cut disks being rotatably and slidably engaged with one another.

6. The length meat device according to claim 3, wherein the rotary body is removably and rotatably attached to said scale body within said arc-shaped groove, and may be removed and replaced with a rotary body having a different shape.

7. The length measuring device according to claim 3, wherein the rotary body is comprised of a plurality of partially cut disks rotatable mounted on the scale body and slidably engaged with each other about the center of rotation of the rotary body.

8. A length measuring device according to claim 1, wherein the scale body is a caliper.

9. A length measuring device for measuring the length from a virtual intersection of extension lines of two sides of a bent member to an end of either of two sides of the bent member, said length measuring device comprising:

a scale body having a flat planar base and graduations mounted on the flat planar base;

a rotary body comprised of a circular main body having an upper surface and lower surface mounted on the scale body, and a fan-shaped raised part formed on the upper surface of the circular main body, the raised part having a first end and a second end, the first end of the raised part extending in a radial direction of the circular main body forming a first contacting side, wherein the scale body has a second contacting side, and the first contacting side and the second contacting side are arranged to be on straight lines which cross at an intersection to be aligned with the virtual intersection when the sides of the bent member engage the first and second contacting sides.

10. A length measuring device according to claim 9, wherein a means for rotating the rotary body is one or more bearings inserted between the rotary body and the flat planar base.

11. A length measuring device according to claim 9, wherein a means for rotating the rotary body is disposed at a center of rotation of the rotary body.

12. A length measuring device according to claim 9, wherein a means for rotating the rotary body is disposed at a position other than a center of rotation of the rotary body.

13. A length measuring device according to claim 9, wherein the scale body is a caliper.

* * * * *

UNITED STATES PATENT AND TRADEMARK OFFICE
CERTIFICATE OF CORRECTION

PATENT NO. : 6,289,598 B1  
DATED : September 18, 2001  
INVENTOR(S) : K. Tanabe Page 1 of 1

It is certified that error appears in the above-identified patent and that said Letters Patent is hereby corrected as shown below:

<u>Title page,</u>  
Item [73], Assignee, should read -- Tanabe Seisakusho Limited --.

Signed and Sealed this

Fourteenth Day of May, 2002

*Attest:*

*Attesting Officer*

JAMES E. ROGAN  
*Director of the United States Patent and Trademark Office*